United States Patent [19]

Johnson et al.

[11] 4,252,246
[45] Feb. 24, 1981

[54] CAP ASSEMBLY FOR A VEHICLE FUEL TANK

[75] Inventors: Lawrence P. Johnson, Huron; Oscar G. Kitchin, Port Clinton, both of Ohio

[73] Assignee: General Motors Corporation, Detroit, Mich.

[21] Appl. No.: 89,227

[22] Filed: Oct. 29, 1979

[51] Int. Cl.³ .............................................. B65D 51/16
[52] U.S. Cl. .................................. 220/203; 220/288; 220/319
[58] Field of Search ............... 220/202, 204, 203, 288, 220/303, 319

[56] References Cited

U.S. PATENT DOCUMENTS

| | | | |
|---|---|---|---|
| 4,091,955 | 5/1978 | Sloan, Sr. | 220/203 |
| 4,142,648 | 3/1979 | Johnson et al. | 220/203 |

Primary Examiner—George T. Hall
Attorney, Agent, or Firm—Donald F. Scherer

[57] ABSTRACT

A fuel tank cap assembly has a closure, a cover and a skirt. Each of these is an injection-molded component with the cover and skirt having interlocking portions which cooperate to maintain the cap assembled with a portion of the closure secured between the cover and skirt. Also secured between the cover and closure member is a pressure and vacuum valve assembly.

2 Claims, 2 Drawing Figures

U.S. Patent  Feb. 24, 1981  4,252,246

CAP ASSEMBLY FOR A VEHICLE FUEL TANK

This invention relates to fuel cap assemblies and more particularly to fuel cap assemblies wherein a cover and skirt member are interlocked to maintain a threaded closure member positioned therebetween.

It is an object of this invention to provide an improved fuel cap wherein an injection molded cover and skirt member have interlocking portions which cooperate to maintain a threaded closure member in the desired operating position.

It is another object of this invention to provided an improved fuel cap wherein a threaded closure member is positioned between a cover member and a skirt member and wherein the cover member has a plurality of axially extending latching arms which are interlocked with a plurality of radial openings formed in the skirt.

Figure 1:
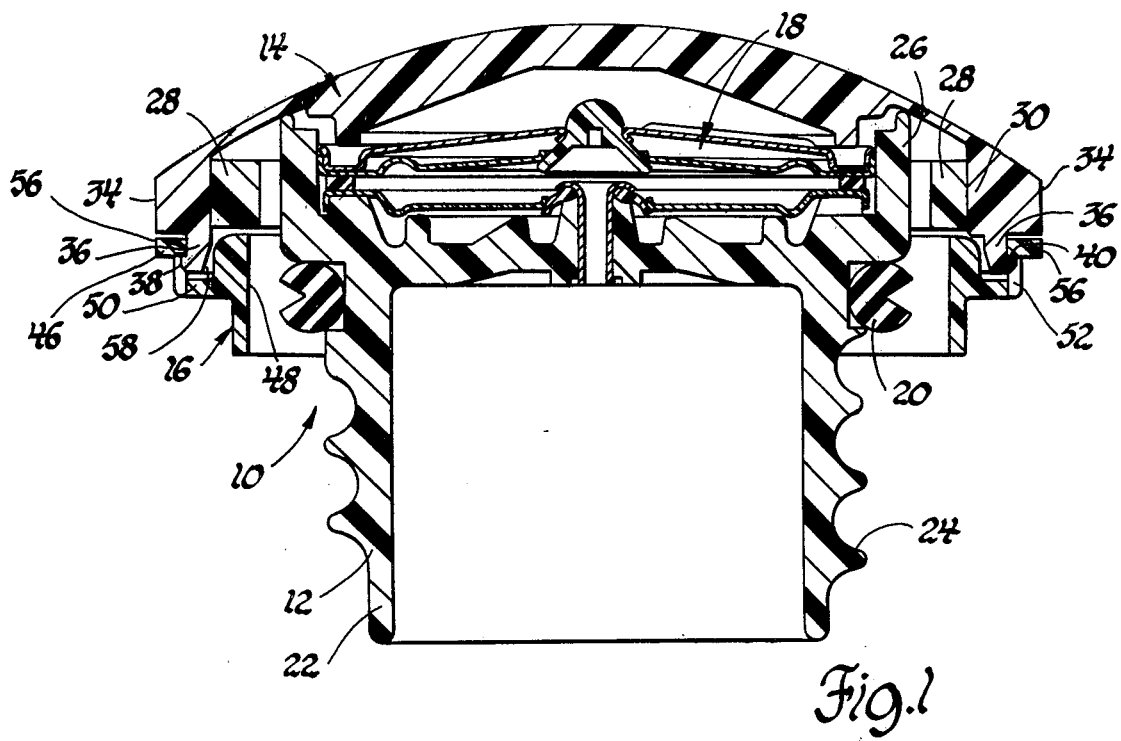
Figure 2:
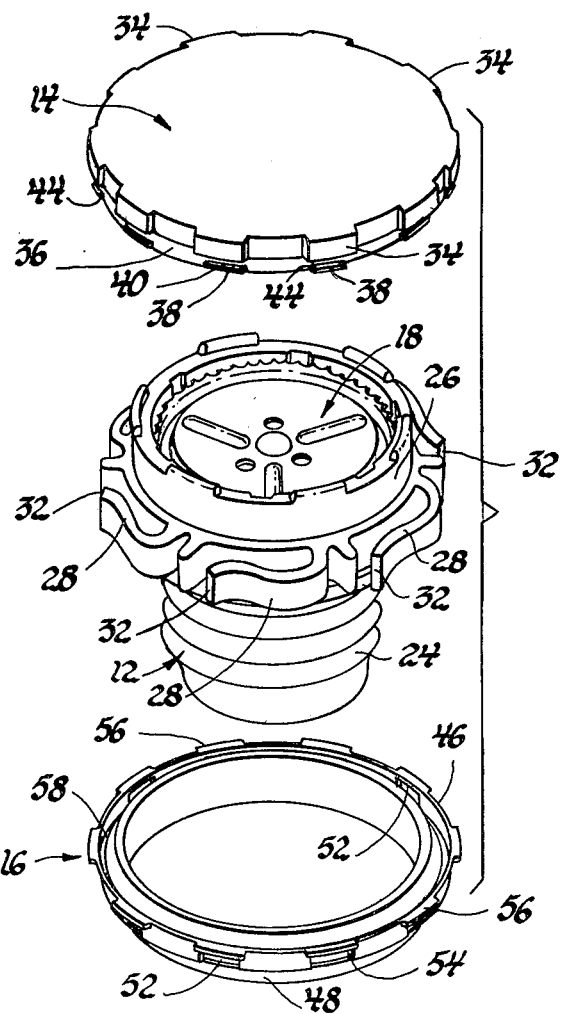

These and other objects and advantages of the present invention will be more apparent from the following description and drawings in which:

FIG. 1 is a cross sectional elevational view of the fuel cap assembly incorporating the present invention; and FIG. 2 is an exploded view of a fuel cap incorporating the present invention.

Referring to the drawings, wherein like characters represent the same or corresponding parts throughout the several views, there is shown a fuel cap, generally designated 10, having a closure member 12, a cover member 14, a skirt member 16, a valve assembly, generally designated 18, and a V-grooved seal ring 20. The valve assembly 18 is preferably constructed in accordance with the valve assembly disclosed in U.S. Pat. No. 3,937,358 issued to Smith et al. Feb. 10, 1976. Those familiar with these types of valve assemblies will appreciate that the valve is capable of venting the interior of a fuel tank when the vapor pressure exceeds a predetermined value and also when a predetermined vacuum is present in the fuel tank.

There are a number of well-known valve structures which will accomplish this same feature such that the construction shown and described in the aforementioned patent is not considered necessary to the utilization of the present invention.

The V-grooved seal ring 20 is preferably constructed in accordance with the seal ring disclosed in U.S. Pat. No. 4,065,026 issued to Williams et al. Dec. 27, 1977. It should also be appreciated that the particular seal ring shown is not necessary to practice the present invention and a number of similar rings may be utilized, if desired.

The closure member 12 has a generally cylindrical body portion 22 which has a threaded outside diameter 24 which is adapted to be threaded to a fuel tank fill tube, not shown. The upper end of cylindrical portion 22 includes a cylindrical flanged portion 26 which has extending radially and circumferentially therefrom a plurality of torque arms 28. The torque arms 28 cooperate with a plurality of torque cams 30 formed on the interior surface of cover 14 such that when the cap is rotated in a tightening direction, the torque arms 28 will ratchet on the cam surfaces at a predetermined torque load. However, when the cap is rotated in the removal direction, the end surfaces 32 of the torque arms 28 will abut a substantially radial portion of cam surface 30 to provide a more positive drive connection between the cover 14 and closure 12 in a well-known manner. The torque limiting structure incorporated in the arms 28 and cams 30 is preferably constructed in accordance with the teaching of U.S. Pat. No. 3,986,634 issued to Smith et al. Oct. 19, 1976.

As can be seen in FIG. 1, the torque arms 28 are disposed between the cover 14 and skirt 16 such that axial movement of the closure relative to the cover and skirt is limited. The cover 14, as best seen in FIG. 2, has a plurality of radially extending protuberances or finger grip portions 34 and an annular portion 36 on which is formed a plurality of radially outwardly extending latching tabs 38 each having an axially facing circumferentially extending latch surface 40. Each latching tab 38 is aligned with a corresponding protuberance 34 and has circumferentially facing axially extending end surfaces 44.

The skirt 16 is generally annular in shape and has a ring portion 46 circumferentially spaced from the main body portion 48 and connected thereto by an annular portion 50. The ring portion 46 has formed therein a plurality of axially extending radial openings 52, each of which have a pair of circumferentially facing axially extending end walls 54. A plurality of protuberances 56 extend radially outward from ring portion 46. Each protuberance 56 is in axial alignment with and has a larger circumferential dimension than each opening 52. These protuberances 56 assist the structural integrity and rigidity of the ring portion 46.

When the cap is assembled, the annular portion 36 of cover 14 extends into the space 58 between the main body portion 48 and ring portion 46 of skirt 16. If the radially extending tabs 38 do not align with openings 52, slight rotation of the cover 14 relative to skirt 16 will complete such alignment such that the surface 40 will abut the axially facing surface of protuberance 56 preventing axial separation of the cover 14 and skirt 16 while the end surfaces 44 and end walls 54 cooperate to prevent relative rotation between the cover 14 and skirt 16. The protuberance 56 will align axially with the protuberances 34 when the cap is properly assembled.

The cover 14 can be manufactured in an injection molding machine which utilizes a split ring structure to form the axial space between the underside of protuberances 34 and the latch surface 40. The skirt 16 can be manufactured by an injection molding process also, however, a simple two-piece mold can be utilized. It should be noted that the two-piece mold would not have to have separate upstanding pins to form the openings 52 since these are formed as continuations of the outer cylindrical surface of ring portion 46 and are not completely surrounded by the annular surface 50 such that the portion of the mold forming the openings 52 can be integral with the side wall of the lower portion of the mold cavity.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in a fuel cap comprising a threaded closure member, a cover member rotatably drivingly connected to said closure member and a skirt member secured to said cover member and being positioned to prevent axial separation of the closure and cover members wherein the improvement comprises; an axially extending portion integral with said cover member, latching tab means extending radially outward from said axially extending portion, each latching tab having an axially facing circumferentially extending latch surface and a pair of circumferentially facing axially extending end surfaces; and said skirt member including a plurality of radial openings adapted to be aligned with said latching tabs and each radial opening having an axially facing circumferentially extending surface mating with the axially facing latch surface on said latching tab and end walls having surfaces which coact with the end surfaces of said latching tabs to prevent relative rotation between said cover and skirt portions.

2. An improvement in a fuel cap comprising a threaded closure member, a cover member rotatably drivingly connected to said closure member and a skirt member secured to said cover member and being positioned to prevent axial separation of the closure and cover members wherein the improvement comprises; axially extending support means, latching tabs extending radially outward from said axially extending support means, each latching tab having an axially facing circumferentially extending latch surface and a pair of circumferentially facing axially extending end surfaces; and protruding finger grip portion formed on said cover member and being longitudinally displaced from and circumferentially aligned with each of the latch surfaces; and said skirt member including a plurality of radial openings adapted to be aligned with said latching tabs and each radial opening having an axially facing circumferentially extending surface mating with the axially facing latch surface on said latching tab and end walls having surfaces which coact with the end surfaces of said latching tabs to prevent relative rotation between said cover and skirt portions and a radially protruding portion extending radially from the axially facing circumferentially extending surface and being axially aligned with said finger grip portion.

* * * * *